United States Patent [19]

Silva et al.

[11] Patent Number: 5,428,225

[45] Date of Patent: Jun. 27, 1995

[54] COUPLED QUANTUM WELL OPTICAL INTENSITY MODULATOR FOR INP BASED OPTOELECTRONIC INTEGRATED CIRCUITS AND METHODS THEREFOR

[75] Inventors: Milson Silva, Sao Carlos, Brazil; Peter R. Herczfeld, Philadelphia, Pa.; Steven A. Malone, Eatontown; Arthur C. Paolella, Howell, both of N.J.

[73] Assignee: The United States of America as represented by the Secretary of the Army, Washington, D.C.

[21] Appl. No.: 242,933

[22] Filed: May 16, 1994

[51] Int. Cl.6 .......................................... H01L 29/205
[52] U.S. Cl. ........................... 257/14; 257/85; 257/96; 257/431; 257/615
[58] Field of Search ................. 257/14, 84, 85, 94, 257/96, 103, 431, 615; 372/42, 96

[56] References Cited

U.S. PATENT DOCUMENTS 5,381,023 1/1995 Komatsu ............................ 257/85

OTHER PUBLICATIONS

J. E. Zucker et al., "Miniature Mach-Zehnder InGaAsP Quantum Well Waveguide Interferometer for 1.3 μm", IEEE Photon. Tech. Lett., 2, 32, 1990.
E. Bigan et al., "Efficient Electroabsorption in InGaAsP/InGaAsP MWQ Optical Waveguide", Electron. Lett., 27, 1607, '91.
N. Debbar et al., "Coupled GaAs/AlGaAs Quantum Well Electro-absorption Modulators for Low Electric Field Optical Modulation", J. App. Phys., 65, 383, 1989.
K. Nakamura et al., "Numerical Analysis of the Absorption and the Refractive Index Change in Arbitrary Semiconductor Quantum-Well Structures", IEEE J. Quantum Electron., 28, 1670, '92.
B. Broberg and S. Lindgren, "Refractive Index of InGaAsP Layers and InP in the Transparent Wavelength Region", J. Appl. Phys., 55, 3376, 1984.
J. E. Zucker et al., "Quaternary Quantum Wells for Electro-Optic Intensity and Phase Modulation at 1.3 and 1.55 μm", Appl. Phys. Lett., 54, 10, 1989.
G. M. Alman et al., "Refractive Index Approximations from Linear Perturbation Theory for Planar MQW Waveguides", IEEE J. Quantum Electron., 28, 650, 1992.
F. Fiedler and A. Schlachetzki, "Optical Parameters of InP-Based Waveguides", Solid-State Electron., 30, 73, 1987.

Primary Examiner—Mark V. Prenty
Attorney, Agent, or Firm—Michael Zelenka; William H. Anderson

[57] ABSTRACT

An integrated optical intensity modulator. The modulator is an optical waveguide on a semi-insulating substrate and having a core layer for transmitting an optical signal. The modulator includes contiguous the core layer an active cladding which has a multicoupled quantum well structure. The multicoupled quantum well includes at least one pair of quantum wells separated by a barrier. The modulator further includes first and second additional claddings wherein the core layer and the active cladding are interposed between the additional claddings. A voltage source generates an electric field through the active cladding which varies the refractive index of the active cladding as a function of the strength of the electric field for modulating the optical signal.

22 Claims, 4 Drawing Sheets

COUPLED QUANTUM WELL OPTICAL INTENSITY MODULATOR FOR INP BASED OPTOELECTRONIC INTEGRATED CIRCUITS AND METHODS THEREFOR

GOVERNMENT INTEREST

The invention described herein may be manufactured, used, and licensed by or for the Government of the United States of America without the payment to us of any royalty thereon.

FIELD OF THE INVENTION

This invention relates in general to optical waveguide communications and, particularly, to an improved optical intensity modulator for InP based optoelectronic integrated circuits.

BACKGROUND OF THE INVENTION

In general, optical modulators vary optical signals for communication of the signals and are useful in a number of applications, including phased array radar, antenna remoting, optical processing of microwave signals and CATV signal distribution. A typical optical modulator has several layers of semiconducting material, including quantum wells, and is fabricated on a monolithic microwave integrated circuit (MMIC). An MMIC is formed by fabricating active and passive circuit elements onto or into the surface of a semi-insulating semiconducting substrate by various methods. These methods include deposition and etching schemes as well as utilizing photolithograph processes for pattern definition.

A quantum yell is defined as a layer of a material with a relatively small band gap between its conduction band and valence band interposed between two layers of material with larger band gaps acting as barriers. Specifically, the barrier layers are typically the same material and have a higher conduction band edge than the conduction band edge of the intermediate layer. In quantum well structures, a phenomenon called the quantum-confined Stark effect (QCSE) significantly alters the optical absorption and index of refraction of the materials when an electric field is applied. The QCSE "red shifts" the absorption spectrum at energies near the conduction band edge, i.e., the wavelength of the absorption spectrum changes toward a longer wavelength, and alters the refractive index for photon energies below the band edge. The modulation of optical signals is based on electroabsorption and electrorefraction in the modulator and the changes in absorption and refractive index are affected by specific properties of the quantum well.

J. E. Zucker et al., "Miniature Mach-Zehnder InGaAsP Quantum Well Waveguide Interferometer for 1.3 $\mu$m", *IEEE Photon. Tech. Lett.*, 2, 32, 1990 and E. Bigan et al., "Efficient Electroabsorption in InGaAsP/InGaAsP MWQ Optical Waveguide", *Electron. Lett.*, 27, 1607, '91, the entire disclosures of which are incorporated herein by reference, show electrorefraction and electroabsorption modulators fabricated to include uncoupled quantum wells. These modulators are small in size and provide a potentially large bandwidth. Disadvantageously, these modulators require a high drive voltage and suffer from relatively high insertion loss. Insertion loss is the loss of optical power caused by the insertion of an optical component.

N. Debbar et al., "Coupled GaAs/AlGaAs Quantum Well Electroabsorption Modulators for Low Electric Field Optical Modulation", *J. App. Phys.*, 65, 383, 1989 and K. Nakamura et al., "Numerical Analysis of the Absorption and the Refractive Index Change in Arbitrary Semiconductor Quantum-Well Structures", *IEEE J. Quantum Electron.*, 28, 1670, '92 disclose symmetric and asymmetric coupled quantum wells for use in optical devices, respectively. The entire disclosures of these documents are also incorporated herein by reference.

SUMMARY OF THE INVENTION

Accordingly, an object of the present invention is to provide an improved optical intensity modulator having a relatively low insertion loss.

Another object of the present invention is to provide an improved optical intensity modulator having a relatively low operating voltage.

These and other objects of the invention are achieved by an optical intensity modulator according to the present invention. The optical intensity modulator is an integrated optical waveguide on a semi-insulating substrate and having a core layer for transmitting an optical signal. The modulator includes contiguous the core layer an active cladding which has a multicoupled quantum well structure. The multicoupled quantum well includes at least one pair of quantum wells separated by a barrier. The modulator further includes first and second additional claddings wherein the core layer and the active cladding are interposed between the additional claddings. A voltage source generates an electric field through the active cladding which varies the refractive index of the active cladding as a function of the strength of the electric field for modulating the optical signal.

Alternatively, the invention may comprise various other systems and methods. Other objects and features will be in part apparent and in part pointed out hereinafter.

BRIEF DESCRIPTION OF THE DRAWINGS

Some of the elements of the Figures have not been drawn to scale for purposes of illustrating the invention. Moreover, corresponding reference characters indicate corresponding parts throughout the drawings.

DETAILED DESCRIPTION

Figure 1:
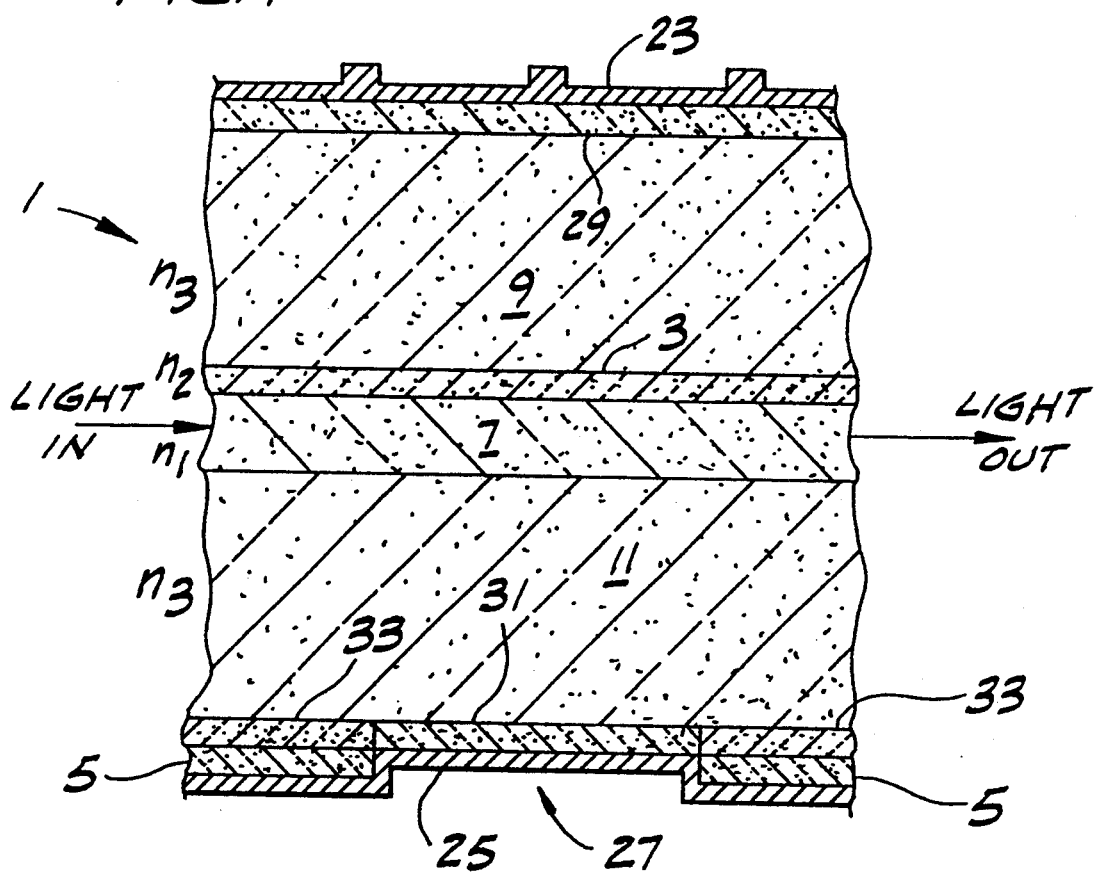
FIG. 1 is a fragmentary cross-sectional view of an optical intensity modulator having a multicoupled quantum well structure according to the present invention.

FIG. 1 shows a preferred embodiment of an optical intensity modulator 1 according to the invention. Preferably, the modulator 1 is an electrorefraction intensity modulator operating at a wavelength of 1.3 μm and employing a multicoupled quantum well (MCQW) structure 3 (shown in more detail in FIG. 2). Modulator 1 generates an electrically induced periodic structure, i.e., a grating, instead of using an interferometric device for modulating optical signals. Advantageously, modulator 1 according to the present invention provides lower operating voltage and lower insertion loss than conventional optical modulators.

As shown in FIG. 1, modulator 1 is an integrated optical waveguide structure fabricated on a semi-insulating substrate 5 for intensity modulating an optical signal. The waveguide structure of modulator 1 includes a core layer 7 having a refractive index $n_1$ through which an optical signal is transmitted. In this embodiment of the invention, the MCQW structure 3 is adjacent the core layer 7 and provides active cladding with a refractive index $n_2$. One period of MCQW structure 3 is shown in detail in FIG. 2. Modulator 1 further includes additional claddings, such as a first passive cladding 9 and a second passive cladding 11, each having a refractive index $n_3$. Preferably Core layer 7 and MCQW structure 3 are interposed between the passive claddings 9, 11.

Figure 2:
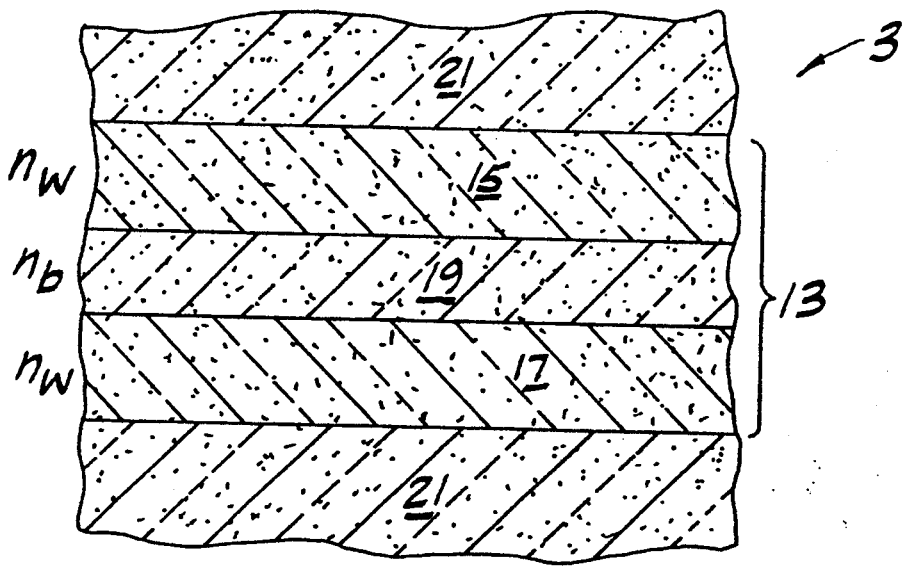
FIG. 2 is an enlarged view of the multicoupled quantum well structure of FIG. 1.

FIG. 2 illustrates a portion of MCQW structure 3 which includes a coupled quantum well structure 13 comprised of two identical quantum wells 15, 17 separated by a barrier 19. Each quantum well 15, 17 has a refractive index $n_w$ and the barrier 19 has a refractive index $n_b$. In a preferred embodiment, MCQW structure 3 includes a plurality of the well structures identical to quantum well structure 13 formed one on another and decoupled from each other by decoupling barriers 21. Preferably, MCQW structure 3 consists of at least five periods, or layers, of coupled quantum well structures 13, each coupled quantum well structure 13 being substantially identical to the others and separated by decoupling barriers 21.

Referring again to FIG. 1, a periodic electrode pattern 23 on top of modulator 1 and a ground electrode 25 deposited through a metalized via hole 27 provide ohmic contacts to a voltage source (not shown). Modulator 1 further include cap layers 29 and 31 for providing good electrical contact with the metalized electrodes 23 and 25. Preferably, cap layer 31 only covers the portion of ground electrode 25 corresponding to via hole 27 and a buffer layer 33 is positioned between substrate 5 and passive cladding 11 over the remaining portions of ground electrode 25.

In a preferred embodiment of the present invention, modulator 1 is fabricated on semi-insulating substrate 5 which is comprised of InP. Core layer 7 is an n doped 0.34 μm thick layer of InGaAsP ($n_1=3.3226$) and both core layer 7 and MCQW structure 3 are interposed between 1.0 μm thick layers of n and p doped InP ($n_3=3.2091$) which serve as passive claddings 9, 11, respectively. Preferably, each quantum well 15, 17 of coupled well structure 13 is a layer of InGaAsP 35 Å thick ($n_w=3.52$). Quantum wells 15, 17 are separated by barrier 19 which is a 30 Å thick layer of InP ($n_b=3.2091$). The decoupling barriers 21 are preferably 100 Å thick layers of InP. Further, layers of n+ and p+ doped InP serve as cap layers 29 and 31, respectively and the buffer layer 33 is n- doped InP.

In operation, modulator 1 acts as a conventional waveguide when no voltage is applied across modulator 1. In other words, the light coupled to the waveguide core 7 is guided through modulator 1 as it would be in a conventional waveguide. According to the present invention, the voltage source applies a reverse, or negatively biased, voltage across electrodes 23, 25 for generating an electric field through MCQW structure 3 perpendicular to the direction of propagation of the optical signals. The electric field generated by the applied voltage periodically varies the refractive index of the waveguide active cladding (MCQW structure 3). In other words, the electric field essentially generates a grating for modulating the optical signal. The change in the refractive index is a function of the orientation of the electric field and its strength. The interaction of light with the electrically generated grating scatters light out of modulator 1 thereby generating a modulated optical output.

Applying an electric field perpendicular to MCQW structure 3 causes the wavelength of the spectrum for absorption in MCQW structure 3 to move toward a longer wavelength. This results in increased absorption and increased refractive index below the conduction band edge. The electric field red shifts the ground-state exciton peak. An exciton is a mobile, electrically neutral, excited state of holes and electrons in a crystal. In order to fabricate an electrorefractive intensity modulator with relatively low insertion loss and relatively low drive voltage, such as modulator 1, the refractive index change is maximized while the absorption is minimized.

As described above, each coupled quantum well structure 13 is comprised of two narrow wells, quantum wells 15, 17, separated by thin barrier 19. The adjacent wells 15, 17 share wave functions since the electrons and holes are able to tunnel through thin barrier 19. Wells 15, 17 are made with identical material and thickness causing coupled quantum well structure 13 to be to symmetric. Otherwise, coupled quantum well structure 13 would be asymmetric. The electron and hole wave functions in uncoupled quantum wells are only slightly altered by the electric field, but in coupled quantum well structures 13 having tailored dimensions, the electric field significantly distorts the wave functions. The exciton peak of each coupled quantum well structure 13 shifts linearly with the electric field while the exciton peak of an uncoupled quantum well would shift quadratically. In other words, shifting the exciton peak to a given energy requires less voltage for coupled well structure 13 than for uncoupled wells. Moreover, the operating wavelength of modulator 1 is preferably selected to be close to the exciton peak when the refractive index change is large without incurring a high optical insertion loss.

The refractive index change of quantum well structure 13 is related to 1) the biaxial birefringence induced by the electric field; 2) the linear electro-optic effect; and 3) the quantum-confined Stark effect (which is a quadratic electro-optic effect). The refractive indices of wells 15, 17 and barrier 19 change according to:

$$\Delta n_w = \tfrac{1}{2}n_w^3[R_w(V/d) + S_w(V/d)^2]; \text{ and}$$
$$\Delta n_b = \tfrac{1}{2}n_b^3[R_b(V/d) + S_b(V/d)^2]$$

where $\Delta n_w$ and $\Delta n_b$ are the refractive index changes of wells 15, 17 and barrier 19, respectively. $R_w$ and $R_b$ represent the linear electro-optic coefficients of wells 15, 17 and barrier 19, respectively and $S_w$ and $S_b$ represent quadratic electro-optic coefficients of wells 15, 17 and barrier 19, respectively. The applied voltage is denoted by V and the thickness of the depletion region is denoted by d.

According to the above equations, the estimated linear and quadratic electro-optic coefficients at 1.3 μm wavelength are:

$$R_w = 2.11 \times 10^{-12} \text{ m/V}; S_w = 3.36 \times 10^{-18} \text{ m}^2/\text{V}^2;$$

$$R_b = 1.59 \times 10^{31}\ ^{12} \text{ m/V};$$

and $$S_b = 5.26 \times 10^{-21} \text{ m}^2/\text{V}^2.$$

In "Quaternary Quantum Wells for Electro-Optic Intensity and Phase Modulation at 1.3 and 1.55 μm", *Appl. Phys. Lett.*, 54, 10, 1989, J. E. Zucker et al. report experimental linear and quadratic electro-optic coefficients (e.g., 4.3 meV below the exciton ground-state transition for an InGaAsP uncoupled quantum well).

G. M. Alman et al., "Refractive Index Approximations from Linear Perturbation Theory for Planar MQW Waveguides", *IEEE J. Quantum Electron.*, 28, 650, 1992, provides a thin-film approximation for a layered dielectric to estimate the refractive index of an MCQW. According to the invention, the approximate refractive index of MCQW structure 3 is $n_2 = 3.3212$ which is used to calculate the propagation conditions for the planar waveguide modulator 1 shown in FIG. 1. The InP layers for these calculations are assumed to be semi-infinite in extent. For guided modes in an MCQW structure, such as MCQW structure 3, two cases must be considered:

$$n_1 > n_2 \geq N_{eff} \geq n_3$$

and $$n_1 \geq N_{eff} \geq n_2 > n_3,$$

where $n_1$, $n_2$, and $n_3$ denote the refractive indices of core 7, MCQW structure 3 including coupled quantum well structure 13, and passive claddings 9, 11, respectively. The effective refractive index is defined as $N_{eff} = \beta/k_0$, where $k_0 = 2\pi/\lambda_0$, $\beta$ is the longitudinal propagation constant, and $\lambda_0$ is the wavelength in free space. In the preferred embodiment of modulator 1, the equation $n_1 > n_2 \geq N_{eff} \geq n_3$ provides acceptable results. B. Broberg and S. Lindgren teach refractive index data for InP and InGaAsP in "Refractive Index of InGaAsP Layers and InP in the Transparent Wavelength Region", *J. Appl. Phys.*, 55, 3376, 1984.

Figure 3:
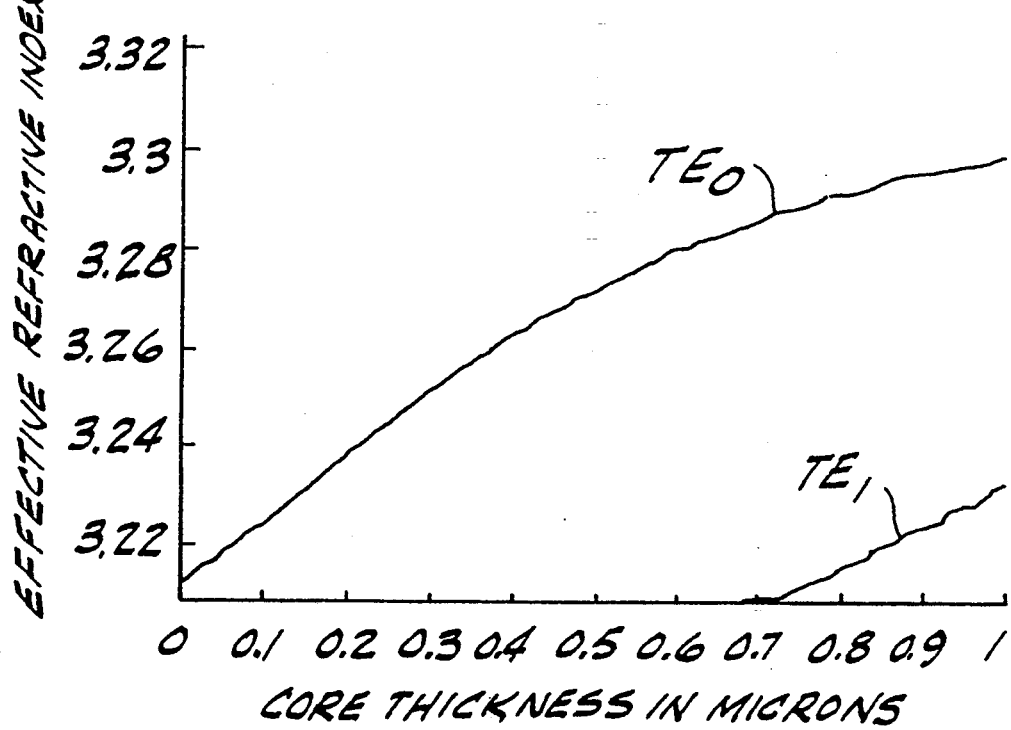
FIG. 3 is a graphical illustration of optical waveguide dispersion according to the present invention.

An optical waveguide dispersion diagram for the first two guided modes of modulator 1, $TE_0$ and $TE_1$, is shown in FIG. 3. For each mode in an optical waveguide, waveguide dispersion describes the process by which an electromagnetic signal is distorted by virtue of the dependence of the phase and group velocities on wavelength as a consequence of the geometric properties of the waveguide. In other words, waveguide dispersion relates to the dependence of the propagation constant $\beta$ on wavelength. The effective refractive index is calculated by $N_{eff} = \beta/k_0$, where $k_0 = 2\pi/\lambda_0$, $\beta$ is the longitudinal propagation constant, and $\lambda_0$ is the wavelength in free space. As shown by FIG. 3, modulator 1 operate in a single mode when core 7 has a thickness T less than 0.65 μm.

Figure 4:
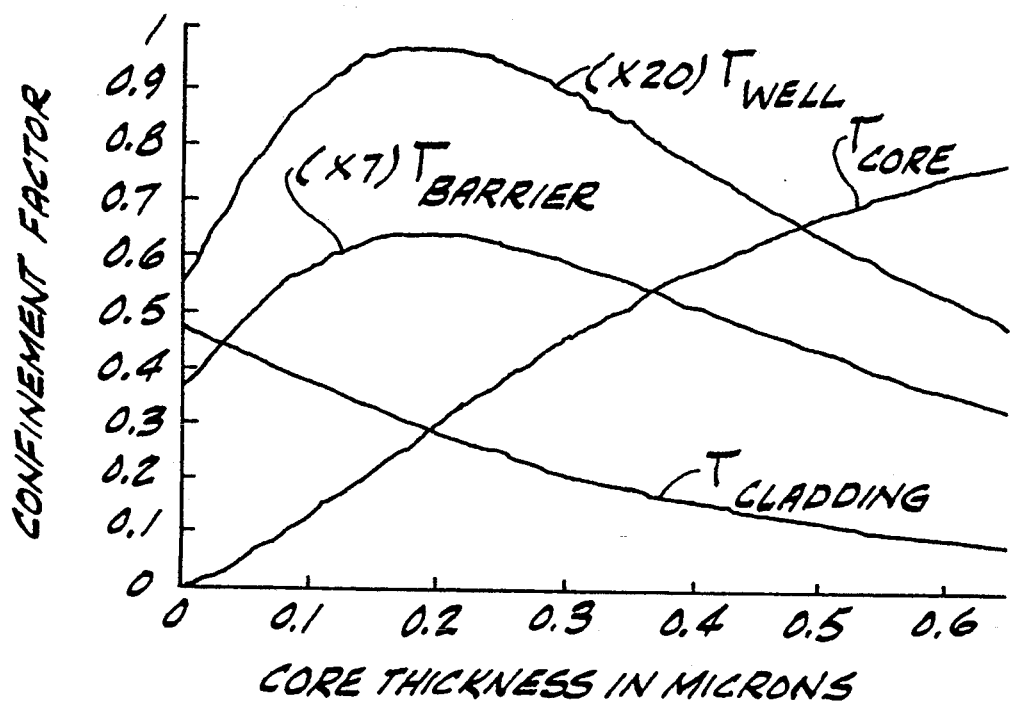
FIG. 4 is a graphical illustration of structure confinement factors according to the present invention.

A simulated structure confinement factor $\Gamma$ is shown in FIG. 4. At thickness T=0.2 μm for core 7, confinement factors of wells 15, 17 and barrier 19 are optimal. The confinement factor of core 7, however, is only 0.3 for this thickness of core 7. For a thickness T=0.34 μm for core 7, however, the confinement factors of wells 15, 17 and barrier 19 are 0.045 and 0.08, respectively, and the confinement factor of core 7 is 0.5. Thus, core 7 has a thickness of 0.34 μm in a preferred embodiment of the invention.

Figure 5:
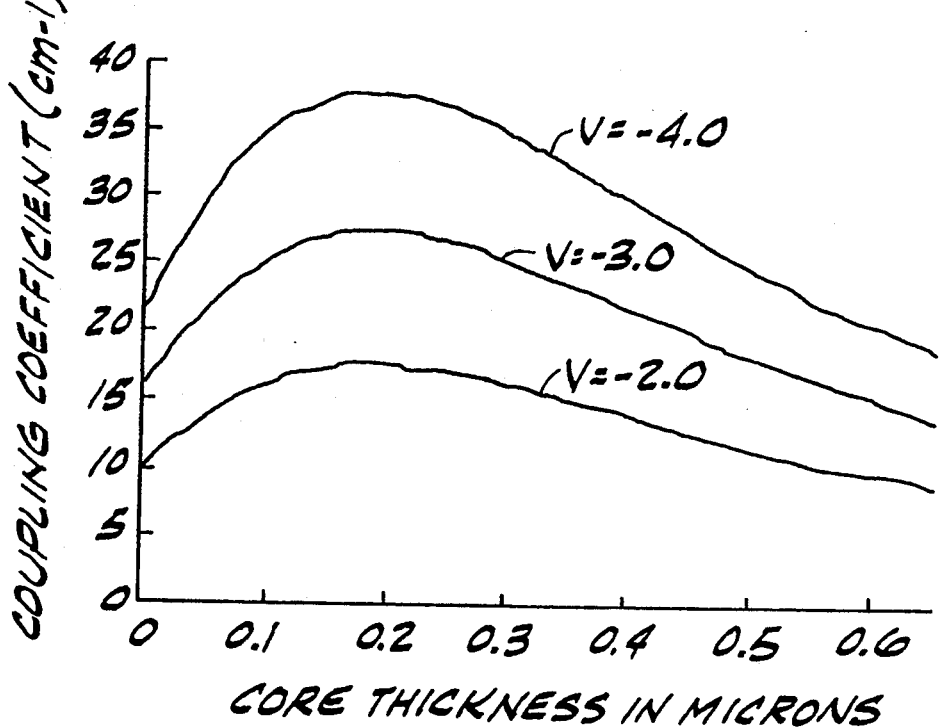
FIG. 5 is a graphical illustration of coupling coefficient and core thickness for different applied voltages according to the present invention.

Simulations of the coupling coefficient, device geometry, bandwidth, and insertion loss are used to study the performance of modulator 1. The coupling coefficient, which gives the strength of the interaction between the optical signal and the electrically generated grating, is calculated according to coupled mode theory. The coupling coefficient for a first order grating, having a period of 0.2 μm is shown in FIG. 5. For the preferred thickness T=0.34 μm for core 7, the coupling coefficient increases from 15 cm$^{-1}$ at $-2.0$ V to 33 cm$^{-1}$ at $-4.0$ V.

Figure 6:
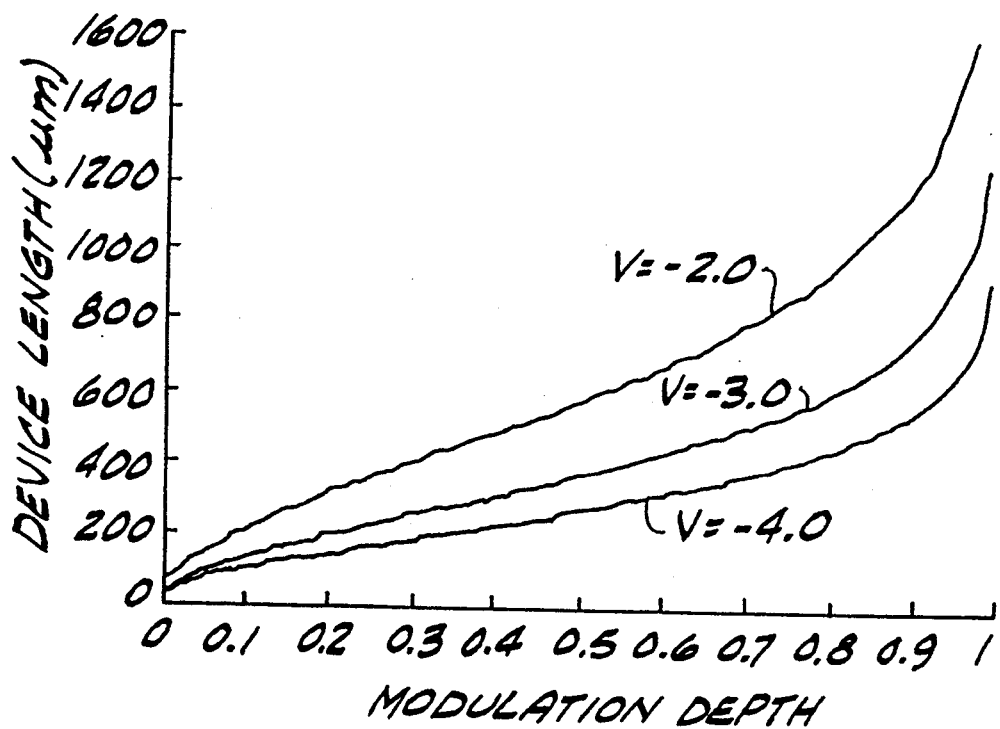
FIG. 6 is a graphical illustration of device length as a function of modulation depth for different applied voltages according to the present invention.

The length of modulator 1 as a function of the modulation depth is shown in FIG. 6. For example, if modulator 1 has a modulation depth of 0.5 and an applied voltage of $-4.0$ V, the length must be 270 μm. Therefore, a longer device is required when increasing the modulation depth and decreasing the applied voltage.

Figure 7:
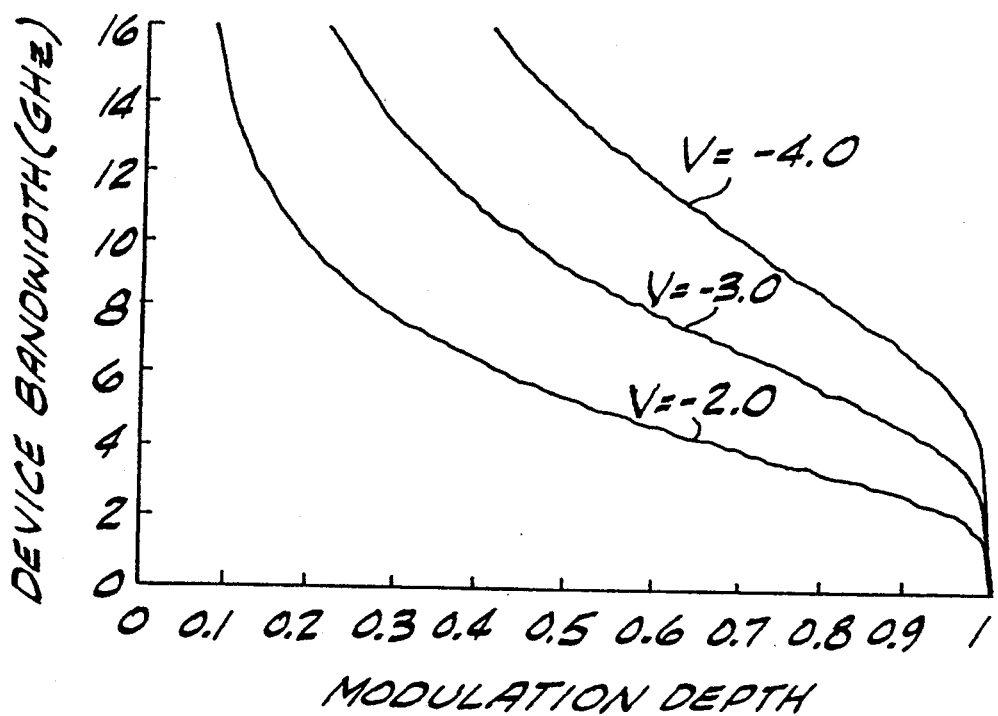
FIG. 7 is a graphical illustration of device bandwidth as a function of modulation depth for different applied voltages according to the present invention.

FIG. 7 illustrates the device bandwidth as a function of the modulation depth. Assuming electrode 23 has a length of 3 mm, a bandwidth of 14 GHz results when modulator 1 has a modulation depth of 0.5 and the applied voltage is $-4.0$ V. Increasing the modulation depth and decreasing the applied voltage results in narrower bandwidth devices.

Figure 8:
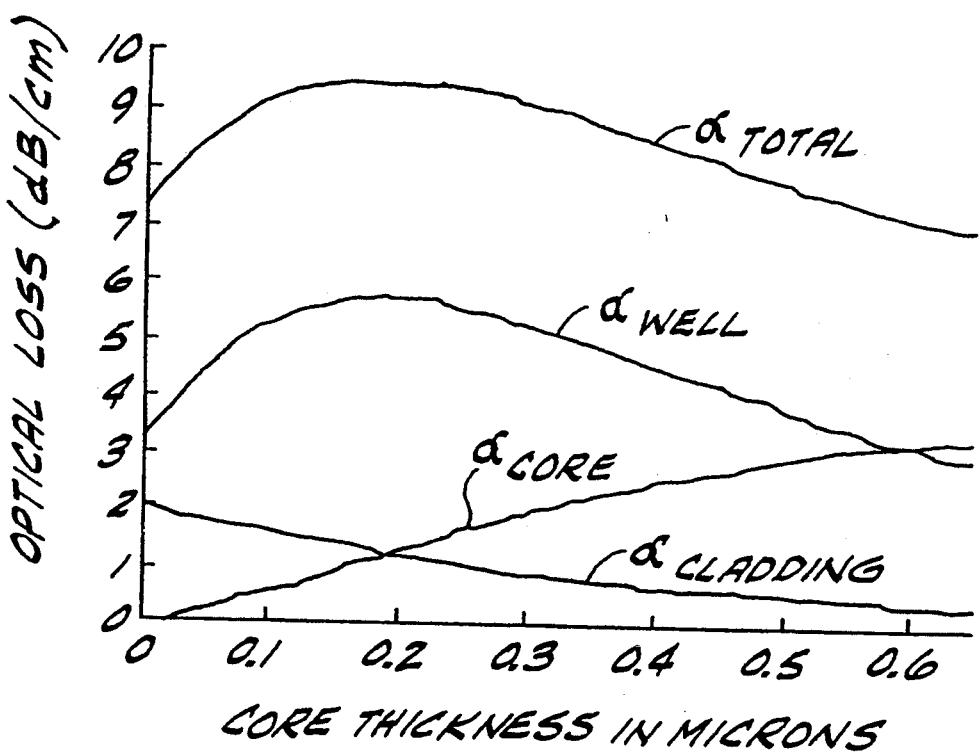
FIG. 8 is a graphical illustration of optical loss as a function of core thickness according to the present invention.

F. Fiedler and A. Schlachetzki calculated the optical attenuation of InP and InGaAsP in "Optical Parameters of InP-Based Waveguides", *Solid-State Electron.*, 30, 73, 1987. The optical attenuation of the InGaAsP quantum well is estimated to be 120 dB/cm for experimental purposes. As shown in FIG. 8, the optical insertion loss, which depends on the thickness of core 7, is primarily caused by coupled quantum well structure 13. When the thickness of core 7 is 0.34 μm, the loss associated with modulator 1 is 9.0 dB/cm. Thus, for modulator 1 having a length of 270 μm, optical loss is only 0.24 dB.

The present invention is also directed to a method for manufacturing optical intensity modulator 1 on semi-insulating substrate 5. The method includes the steps of forming n+ doped cap layer 29 on substrate 5 and forming n doped passive cladding 11 on n+ doped cap layer 29. Further, n doped core layer 7 through which an optical signal is transmitted is formed on n doped passive cladding 11 and MCQW structure 3 is formed on core 7. MCQW structure 3 includes coupled quantum well structure 13 having at least one pair of coupled quantum wells 15, 17 separated by barrier 19. The method further includes the steps of forming p doped passive cladding 9 on MCQW structure 3 and forming p+ doped cap layer 31 on p doped passive cladding 9. A voltage is applied across modulator 1 whereby an electric field is generated through MCQW structure 3 thereby varying the refractive index $n_2$ of MCQW structure 3.

It is also to be understood that another preferred embodiment of the present invention relates to a similar type of optical modulator which includes a semi-insulating GaAs substrate. Such a modulator also uses an electrically induced periodic variation in refractive index to modulate the optical signal. In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An integrated optical waveguide on a semi-insulating substrate for intensity modulating optical signals comprising:
   a core layer for transmitting an optical signal;
   an active cladding contiguous to the core layer, said active cladding including an optically coupled quantum well structure, said optically coupled quantum well structure including a pair of optically coupled quantum wells physically separated by a barrier;
   a first additional cladding;
   a second additional cladding, said core layer and said active cladding being interposed between the first and second additional claddings; and
   a voltage source for generating an electric field in the active cladding to vary the refractive index of the active cladding as a function of the strength of the electric field.

2. The waveguide of claim 1 further comprising a first cap layer and a second cap layer, said first cap layer being contiguous the substrate, said first and second additional claddings being interposed between the first and second cap layers, respectively.

3. The waveguide of claim 2 further comprising ohmic contacts provided by a periodic electrode pattern on the second cap layer and a ground electrode on the first cap layer, said voltage source being connected to the ohmic contacts for applying a reverse voltage to the waveguide.

4. The waveguide of claim 2 wherein the first cap layer comprises an n+ doped semiconductor layer formed on the substrate.

5. The waveguide of claim 2 wherein the second cap layer comprises a p+ doped semiconductor layer formed on the second additional cladding.

6. The waveguide of claim 2 wherein the cap layers are each approximately 1.0 $\mu$m thick.

7. The waveguide of claim 1 wherein the substrate comprises a substrate of InP.

8. The waveguide of claim 1 wherein the core layer comprises an n doped semiconductor layer.

9. The waveguide of claim 1 wherein the core layer comprises a layer of InGaAsP.

10. The waveguide of claim 1 wherein the core layer is approximately 0.34 $\mu$m thick.

11. The waveguide of claim 1 wherein each quantum well comprises a layer of InGaAsP.

12. The waveguide of claim 1 wherein each quantum well is approximately 35 Å thick.

13. The waveguide of claim 1 wherein the barrier comprises a layer of InP.

14. The waveguide of claim 1 wherein the barrier is approximately 30 Å thick.

15. The waveguide of claim 1 wherein the active cladding further comprises a second coupled quantum well structure contiguous the first said coupled quantum well structure, said second coupled quantum well structure including a second pair of quantum wells separated by a second barrier.

16. The waveguide of claim 15 wherein the active cladding further comprises a decoupling barrier for separating and decoupling the first said coupled quantum well structure from said second coupled quantum well structure.

17. The waveguide of claim 16 wherein the decoupling barrier comprises a 100 Å layer of InP.

18. The waveguide of claim 1 wherein the active cladding is approximately 0.1 $\mu$m thick.

19. The waveguide of claim 1 wherein the first additional cladding comprises an n doped semiconductor layer.

20. The waveguide of claim 1 wherein the second additional cladding comprises a p doped semiconductor layer.

21. An integrated optical waveguide on a semi-insulating substrate for intensity modulating optical signals comprising:
   a core layer for transmitting an optical signal;
   an active cladding contiguous to the core layer, said active cladding including a plurality of optically coupled quantum well structures, each optically coupled quantum well structure including a pair of optically coupled quantum wells physically separated by a barrier, each optically coupled quantum well structure being contiguous to another of the plurality of optically coupled quantum well structures and physically separated from the other of the optically coupled quantum well structures by a semi-insulating optically decoupling barrier for optically decoupling the optically coupled quantum well structures from each other;
   a first additional cladding;
   a second additional cladding, said core layer and said active cladding being interposed between the first and second additional claddings; and
   a voltage source for generating an electric field in the active cladding to vary the refractive index of the active cladding as a function of the strength of the electric field.

22. An integrated optical waveguide on a semi-insulating substrate for intensity modulating optical signals comprising:
   an n+ doped cap layer formed on the substrate;
   an n doped cladding formed on the n+ doped cap layer;
   an n doped core layer formed on the n doped cladding for transmitting an optical signal;
   an active cladding including at least one pair of optically coupled quantum wells physically separated by a barrier, said active cladding being formed on the core layer;
   a p doped cladding formed on the active cladding;
   a p+ doped cap layer formed on the p doped cladding; and
   a voltage source for generating an electric field in the active cladding to vary the refractive index of the active cladding as a function of the strength of the electric field.

* * * * *